(12) United States Patent
Barr (10) Patent No.: US 6,512,980 B1
(45) Date of Patent: Jan. 28, 2003

(54) NOISE REFERENCE SENSOR FOR USE IN A DUAL SENSOR TOWED STREAMER

(76) Inventor: Frederick J. Barr, 2627 W. Bainbridge Cir., Pearland, TX (US) 77584

(*) Notice: Subject to any disclaimer, the term of this patent is extended or adjusted under 35 U.S.C. 154(b) by 0 days.

(21) Appl. No.: 09/421,163

(22) Filed: Oct. 19, 1999

(51) Int. Cl.$^7$ ................................................ G01V 1/00
(52) U.S. Cl. ........................................ 702/1; 367/159
(58) Field of Search ............................ 367/62, 17–24, 367/15, 159; 340/7; 702/1

(56) References Cited

U.S. PATENT DOCUMENTS

| | | | |
|---|---|---|---|
| 3,283,293 A | 11/1966 | Pavey, Jr. et al. | 340/7 |
| 3,290,645 A | 12/1966 | Pavey, Jr. et al. | 340/7 |
| 3,299,397 A | 1/1967 | Pavey, Jr. et al. | 340/7 |
| 4,345,473 A | 8/1982 | Berni | 745/516 LM |
| 4,437,175 A | 3/1984 | Berni | 367/24 |
| 4,520,467 A | 5/1985 | Berni | 367/24 |
| 5,592,791 A * | 1/1997 | D'Annunzio et al. | 52/167.2 |
| 5,621,699 A * | 4/1997 | Rigsby et al. | 367/22 |
| 5,724,306 A * | 3/1998 | Barr | 367/15 |
| 5,774,416 A * | 6/1998 | Sadek et al. | 367/24 |
| 5,825,716 A * | 10/1998 | Starr | 367/24 |
| 6,029,113 A * | 2/2000 | Woodall | 702/1 |

OTHER PUBLICATIONS

Bernard Widrow et al.; *Adaptive Signal Processing*, Chap. 1, Adaptive Systems, p. 11; Chap. 12, Adaptive Interference Canceling, pp. 302–307.

* cited by examiner

Primary Examiner—Edward Lefkowitz
Assistant Examiner—Victor J. Taylor
(74) Attorney, Agent, or Firm—David S. Figatner; Madan, Mossman & Sriram, P.C.

(57) ABSTRACT

A method of marine seismic surveying, whereby a seismic streamer is towed in a body of water while deploying three (3) sensors in close proximity to each other. In one embodiment of the invention, the first sensor generates a first signal indicative of pressure of the water, the second sensor generates a second signal indicative of vertical movement of water, and the third sensor generates a third signal indicative of vertical movement of the streamer relative to the water. A seismic signal is generated in the water and the resulting signal is detected with each of the three (3) sensors simultaneously during time intervals following the generation of the seismic signal. The second signal is combined with the third signal to generate a fourth signal that measures vertical movement of the water with noise due to streamer vibration attenuated. The first signal is combined with the fourth signal to give a signal that attenuates the ghost due to the water surface. In a second embodiment of the invention, the third sensor is sensitive to the pressure in the water and the vertical motion of the sensor. By combining the output of the three sensors, a substantially noise-free and ghost-free seismic signal is obtained.

34 Claims, 8 Drawing Sheets

NOISE REFERENCE SENSOR FOR USE IN A DUAL SENSOR TOWED STREAMER

BACKGROUND OF THE INVENTION

1. Background of the Invention

The present invention relates generally to marine seismic surveying and, more particularly, to a method and apparatus for reducing the signal noise from vertical movement in a dual sensor towed streamer cable caused by vibrations in the stress members of the streamer.

2. Description of Related Art

Seismic surveying is a method for exploring subterranean formation layers in the earth. An acoustic source generates seismic waves, which insonify the formation layers. Differences in acoustic impedance of adjacent formation layers cause a portion of the seismic waves to reflect from the interfaces between the formation layers. Acoustic impedance varies across formation layers since it is the product of seismic wave velocity and rock density. Seismic sensors detect the seismic waves reflected upward from the formation interfaces and record wave amplitude versus time of arrival as electrical signals for later analysis regarding the locations of the formation interfaces.

Marine seismic surveying is seismic surveying for formation layers in parts of the earth located beneath bodies of water. An acoustic source placed in the water, such as an airgun, generates the seismic waves which insonify the subterranean formation layers. Seismic sensors, typically arrayed at intervals along a streamer cable towed in the water behind a vessel, detect the reflected seismic waves. Marine seismic surveying typically uses pressure sensors, such as hydrophones, to detect changes in water pressure caused by seismic compression and rarefaction waves propagating through the water. The pressure sensors detect the primary pressure waves traveling upward in the water after reflection from the formation interfaces in the earth below the water. The pressure sensors also detect secondary pressure waves traveling downward in the water after a portion of the primary waves traveling upward reflect down from the water surface above. The air-water interface at the water surface has a large contrast in acoustic impedance which causes a large downward reflection. Secondary reflections are unwanted ghost waves, a type of noise in the seismic signal.

The water-earth interface at the water bottom may also have a large contrast in acoustic impedance. Thus, the downward-traveling secondary reflections from the water surface may reflect back upward again from the water bottom. Thus secondary reflections may continue to reverberate through the water column from surface to bottom and back. Water column reverberation is a serious source of signal noise obscuring the primary reflections carrying the sought-after information concerning the subsurface formation layers.

Figure 1:
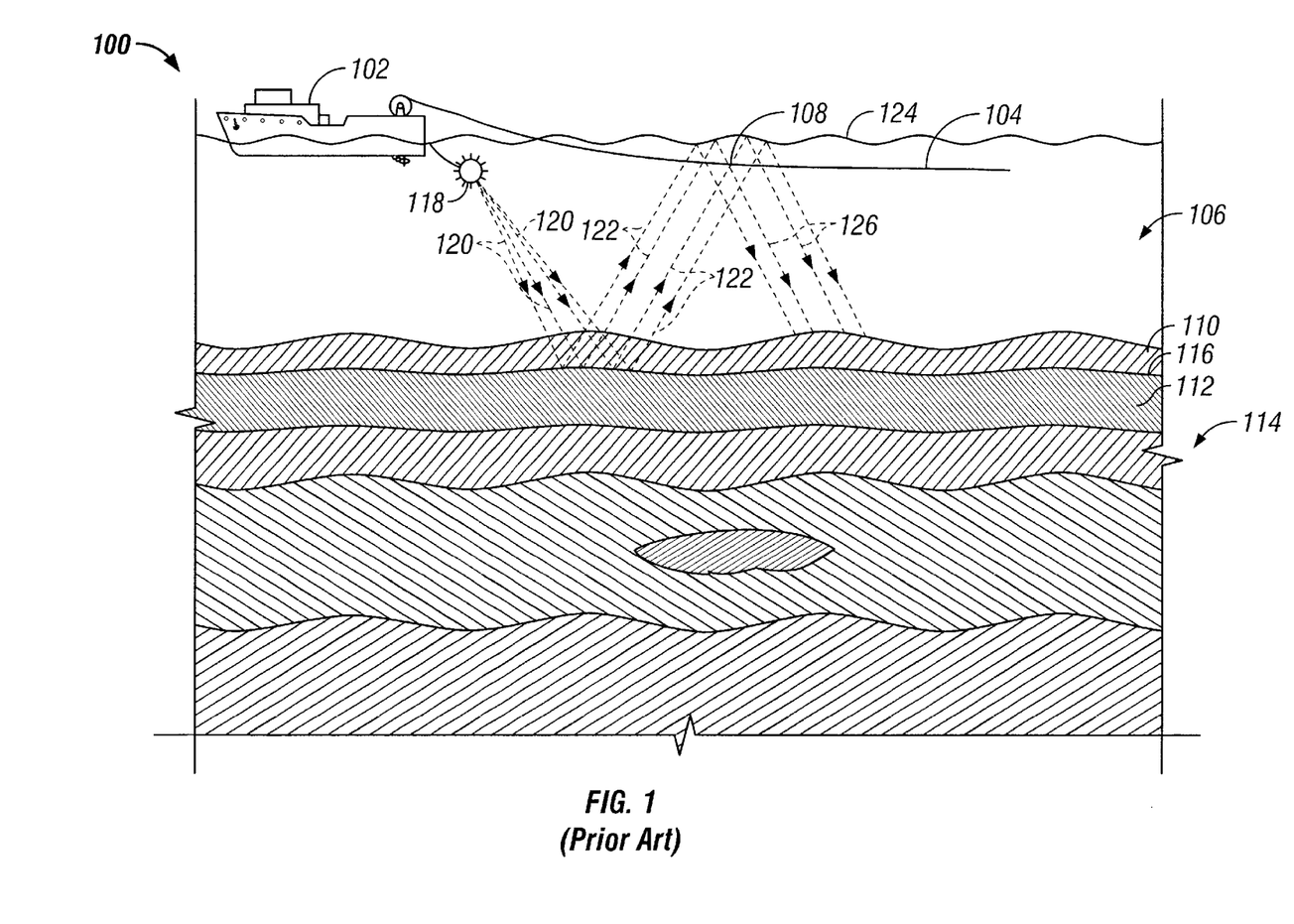
FIG. 1 is a diagrammatic view of marine seismic surveying utilizing a ship towing a seismic streamer through water.

FIG. 1 shows a diagrammatic view of marine seismic surveying employing a seismic streamer cable, generally designated as 100. A ship 102 tows a seismic streamer 104 through a body of water 106. The seismic streamer 104 contains a plurality of sensors 108. Subterranean substrata, such as 110 and 112, to be explored, are located in the earth 114 beneath the body of water 106. Interfaces, such as 116, separate the substrata. An acoustic source 118, such as an air gun, creates seismic waves in the water 106. A portion of the seismic waves travel downward along ray paths 120 through the water 106 toward the earth 114. A portion of the downward-traveling seismic waves reflect upward from an interface, such as interface 116 between substrata 110 and 112. The reflected, upward-traveling seismic waves are primary reflections from the formation layers. The primary reflections travel upward along ray paths 122, a portion of which intersect the towed streamer 104. Sensors 108 deployed in the towed streamer 104 detect the primary reflections. The primary reflections travel past the towed streamer 104 and continue along ray paths 122 upward toward the air-water interface 124 at the surface of the body of water 106. A portion of the seismic waves comprising the primary reflections reflect downward from the air-water interface 124. The twice-reflected, downward-traveling seismic waves are secondary reflections from the water surface. The secondary reflections travel downward along ray paths 126, a portion of which intersect the towed streamer 104. The sensors 108 deployed in the towed streamer 104 detect the secondary reflections from the air-water interface 124.

The towed streamer 104 contains a plurality of sensors 108. Towed streamers 104 typically carry pressure sensors, such as hydrophones, which will be described below in FIG. 2. Dual sensor towed streamers 104 carry pairs of pressure sensors and motion sensors, such as geophones or accelerometers. The present invention adds a third sensor, a noise reference sensor, which will be described below in FIG. 3. The third sensor is a variant of the prior art pressure sensor.

Figure 2:
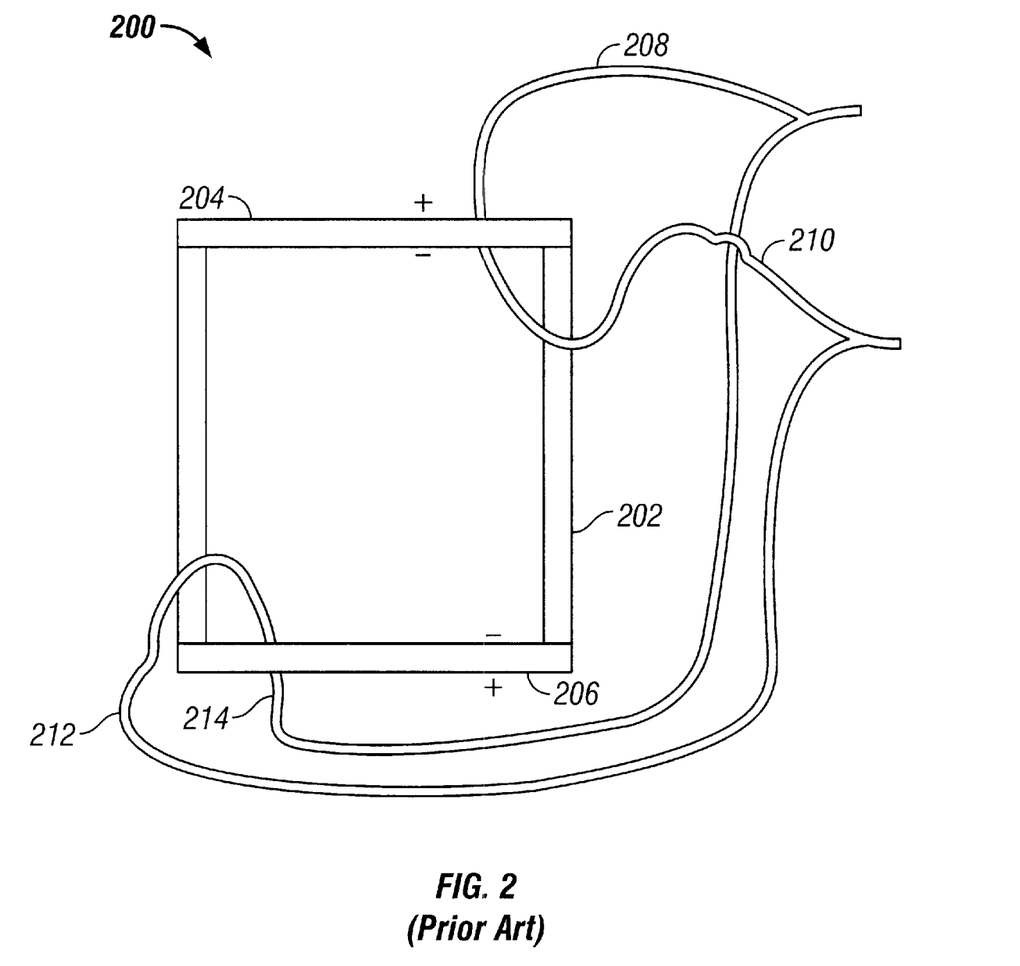
FIG. 2 is a conceptual diagram of an acceleration-canceling hydrophone.
Figure 3A:
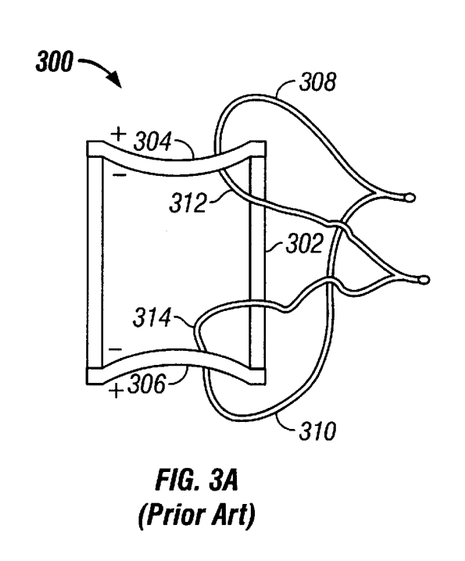
FIGS. 3a–3d are conceptual diagrams of an acceleration canceling hydrophone subject to accelerations and passing seismic waves.

FIG. 2 shows a diagram of a pressure sensor 200, an acceleration-canceling hydrophone, typically used in a towed streamer. The pressure sensor 200 typically comprises a housing 202 having a first end and a second end, a first element 204 mounted at the first end of the housing 202, and a second element 206 mounted at the second end of the housing 202. The first element 204 is mounted parallel to the second element 206. The housing 202 is typically made of brass and the first and second elements 204, 206 are typically made of piezoelectric crystal. A first pair of electric wires 208, 210 attaches to the opposing faces of the first element 204 and a second pair of electric wires 212, 214 attaches to the opposing faces of the second element 206. The arrows in FIG. 2 show the relative polarities of the connections.

Figure 3B:
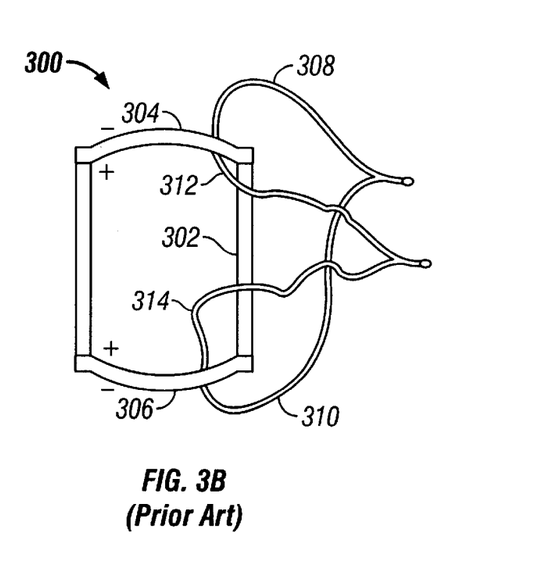
Figure 3C:
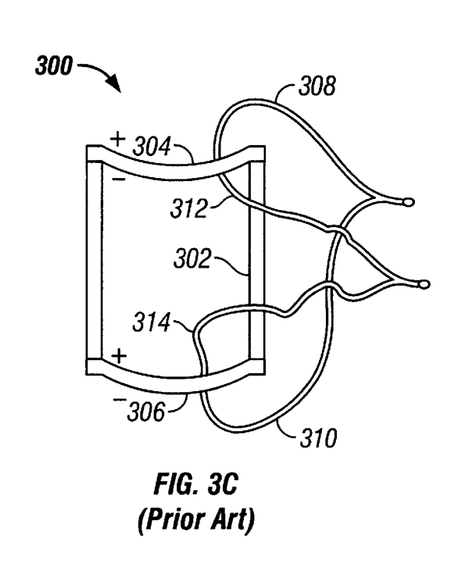
Figure 3D:
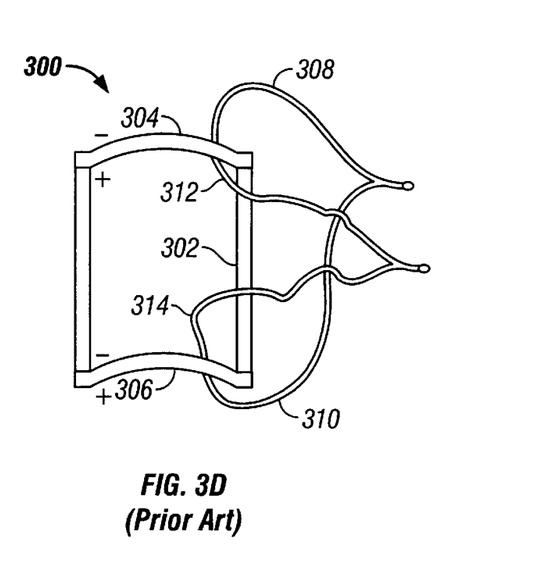

FIGS. 3a–3d show conceptual diagrams of an acceleration canceling hydrophone 300 subject to accelerations and passing seismic waves. The electric wires 308, 310, 312 and 314 are connected so that flexures of the elements 304, 306 such as shown in FIGS. 3a and 3b generate output voltages which add, resulting in a nonzero signal. The pressure manifestation of a compression seismic wave propagating past the pressure sensor 300 causes the flexure of the elements 304, 306 shown in FIG. 3a, while the pressure manifestation of a rarefaction seismic wave propagating past the pressure sensor 300 causes the flexure of the elements 304, 306 shown in FIG. 3b. This flexures of the elements 304, 306 as shown in FIGS. 3c and 3d generate output voltages which cancel, resulting in a substantially zero signal. Upward motion of the pressure sensor 300 through a fluid causes the flexure of the elements 304 and 306 shown in FIG. 3d. The above-described con figuration accomplishes the acceleration canceling property of the typical marine hydrophone 300. The polarity indications on FIGS. 3(a)–3(d) show the relative polarities of signals generated for the flexure of elements 304, 306 as shown.

Marine seismic surveying also uses motion sensors, detecting particle velocity or acceleration, in addition to pressure sensors. Motion sensors typically used in marine seismic surveying are geophones and accelerometers. Motion sensors detect the vertical velocity or acceleration of water particles accompanying seismic waves propagating past the sensors. Thus motion sensors detect primary and secondary reflections, just as pressure sensors do. Proper combination of the signals from pressure sensors and motion sensors can lead to a reduction of secondary reflections from the water surface in the seismic signal. The air-water interface causes a reverse in polarity in the downward reflected pressure wave, since the acoustic impedance of the water exceeds the acoustic impedance of the air. Thus pressure sensors detect a reverse in phase polarity for the secondary reflections from the water surface. The air-water interface does not cause a reverse in polarity in the vertical motion wave. Thus motion sensors do not sense a reverse in phase polarity for the secondary reflections from the water surface. Pressure and motion detectors sense upward traveling primary reflections with the same polarity while sensing downward traveling secondary reflections with opposite polarity. Therefore, combining the signals from pressure and motion detectors enhances the desired primary reflections and reduces the undesired secondary reflections from the water surface.

Combining the signals from pressure sensors with the signals from motion sensors in a dual sensor towed streamer in an effort to reduce the effects of secondary reflections from the water surface is well known in the prior art. Berni discloses methods for the combination of signals from different sensors in three patents. U.S. Pat. No. 4,345,473 teaches combining the signal from a vertical component accelerometer with the signal from a hydrophone to cancel surface reflected waves in marine surveys. U.S. Pat. No. 4,437,175 teaches combining the signal of a hydrophone with the signal of an accelerometer which has passed through a integrator and a high-pass filter. U.S. Pat. No. 4,520,467 teaches combining the filtered signals of a motion sensor and a pressure sensor in proportion to the signal-to-noise ratios of the sensors. All three Berni patents address the problem of reducing unwanted secondary reflections from the water surface by means of dual sensors in a towed streamer, but merely mention the accompanying problem of insulating or filtering out the noise generated by the movement of the streamer itself. Removing the undesired secondary reflections from the desired primary reflections is not effective if streamer vibration noise still remains to obscure the seismic signal. Signal noise caused by streamer vibration is one of the problems encountered in employing dual sensor towed streamers to solve the problem of secondary reflections from the water surface.

One of the particular problems with previous attempts to implement a dual sensor towed streamer has been the high level of undesired vertical motion caused by vibrations in the stress members of the towed streamer. A towed streamer is typically ballasted to be neutrally buoyant. Thus a geophone deployed in the streamer generates output signals proportional to the vertical particle velocity of the seismic reflection waves in the water. Unfortunately, the geophone also generates signals proportional to the vertical velocity of the streamer itself, as caused by vibrations of the stress members of the streamer. The geophone is detecting and recording the primary and secondary reflection waves needed to combine with the hydrophone signal to reduce the effect of secondary reflections from the water surface. However, the geophone is also detecting and recording further noise in the form of streamer motion. The vibrations of the streamer stress members add obscuring noise to the geophone data. Thus, the mere combination of a pressure wave signal from a hydrophone with a particle motion signal from a geophone may severely degrade the signal-to-noise ratio in the seismic frequency band.

Pavey (U.S. Pat. No. 3,282,293) discloses a device in which an attempt is made to have a velocity sensor that is sensitive only to vibrations of the cable and not to the velocity of motion of the water. The effectiveness of this device is greatly reduced due to the use of a copper coil having a significant inertial mass as part of the sensor.

The present invention is directed toward improving the effectiveness of the dual sensor towed streamer by reducing the signal noise coming from vertical motion caused by vibrations in the stress members of the streamer.

SUMMARY OF THE INVENTION

The present invention is a method for reducing the signal noise from vertical movement in a dual sensor towed streamer cable caused by vibrations in the stress members of the streamer. A seismic streamer is towed in a body of water while deploying three (3) sensors in close proximity to each other. The first sensor generates a first signal indicative of pressure of the water, the second sensor generates a second signal indicative of vertical movement of water particles and vertical motion of the streamer in the water, and the third sensor generates a third signal indicative of vertical movement of the streamer relative to the water, i.e., streamer noise. A seismic signal is generated in the water and the resulting signals are recorded from each of the three (3) sensors simultaneously during time intervals following the generation of the seismic signal. The second signal is combined with the third signal to generate a fourth signal that is a measurement of vertical movement with the streamer noise attenuated. The first signal is combined with the fourth signal to give a ghost free seismic reflection signal.

BRIEF DESCRIPTION OF THE DRAWINGS

A better understanding of the benefits and advantages of the present invention may be obtained from the appended detailed description and drawing figures, wherein.

A better understanding of the benefits and advantages of the present invention may be obtained from the appended detailed description and drawing figures, wherein.

DETAILED DESCRIPTION OF THE PREFERRED EMBODIMENTS

Figure 4:
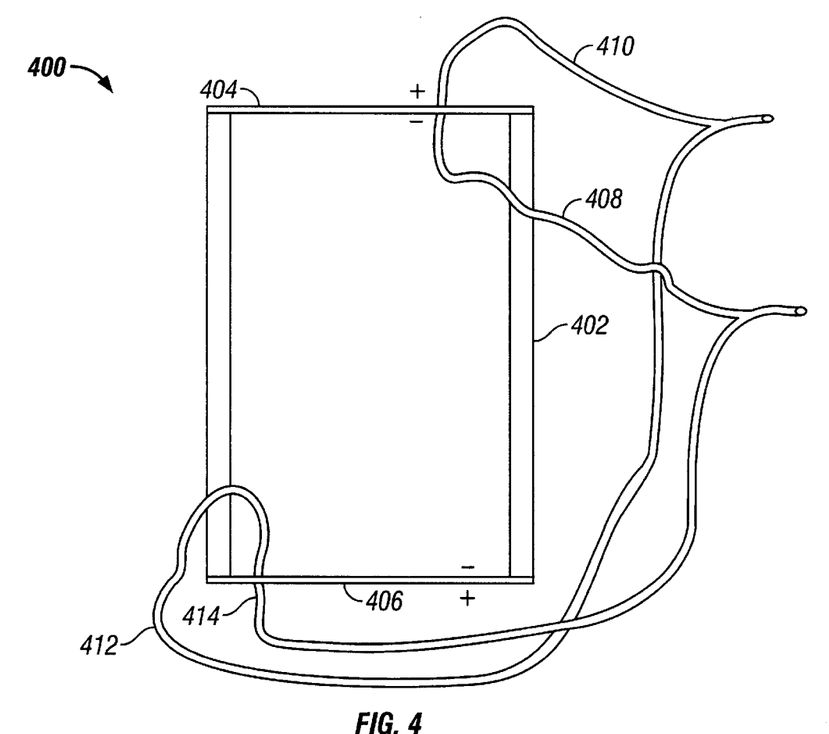
FIG. 4 is a view of the preferred embodiment of the noise reference sensor.

FIG. 4 shows a preferred embodiment of the third sensor 400 of this invention, the noise reference sensor. The polarity signs in FIG. 4 show the connection of the leads. The third sensor 400 is a variation of the above-described acceleration cancelling hydrophone described in connection with FIGS. 2 and 3, wherein the elements are made with two flexible sheets 404, 406, preferably of polyvinylidene fluoride ("PVDF") film, mounted parallel to each other at the opposite ends of the housing 402, in place of the two piezoelectric crystals. Other piezoelectric material such as piezoelectric crystals or ceramics may be substituted for the PVDF film, its PVDF film is preferred because of its low mass. Due to the small mass of the PVDF film, its response to motion rive to inertial is negligible and it responds primarily to the relative motion of the cable to the water. The third sensor 400 is formed by reversing a par of wires, 408, 410 or 412, 414 on one of the two sheets 404, 406 of PVDF film relative to their arrangement in FIG. 3. This has the effect of turning a hydrophone into an accelerometer. Now flexures as shown in FIGS. 3e and 3d generate output voltages which add, giving a nonzero signal. Thus the third sensor 400 is sensitive only to motion relative to the surrounding fluid. Flexures as shown in FIGS. 3a and 3b generate output voltages which cancel, giving a substantially zero signal. Thus the third sensor 400 is not sensitive to seismic waves propagating past the third sensor 400. The streamer containing the sensors is ballasted to be nearly neutrally buoyant. Thus the skin, internal parts and internal fluids of the seismic streamer move in harmony with the water molecules around the streamer as an seismic reflection wave propagates past. The motion sensor and its gimbal support both move in harmony with the surrounding water molecules. If the third sensor 400 is vertically oriented by a gimbal support, preferably the same one containing the motion sensor, the third sensor 400 experiences the same motion as the motion sensor.

Flexures as shown in FIGS. 3a and 3b, caused by seismic wave pressure, now generate output voltages which cancel, giving a substantially zero signal for the noise reference sensor 400. The noise reference sensor 400 is insensitive to the pressure manifestations of seismic waves propagating past the sensor. There may be some extremely slight bending of the PVDF sheets 404, 406 due to their mass and acceleration relative to inertial space. But, because of the very small mass of the PVDF sheets 404, 406, this sensitivity to motion will be negligible. The noise reference sensor 400 also moves with the geophone case, relative to inertial space, in response to the particle velocity of a seismic reflection wave. However, in this situation, the upper and lower PVDF sheets 404, 406 move in synchronization with the fluid molecules above and below the sensor. The lack of differential movement between the sensor and the fluids around it means there is no flexure of the upper and lower PVDF sheets 404, 406 caused by the particle motion manifestation of the seismic wave. Thus, no output voltage is generated. Therefore, the noise reference sensor 400 is substantially insensitive to seismic waves. It is substantially sensitive to vertical vibrations of the streamer caused by its being towed through the water. It is substantially sensitive to vertical vibrations of the streamer caused by its being towed through the water.

Figure 5:
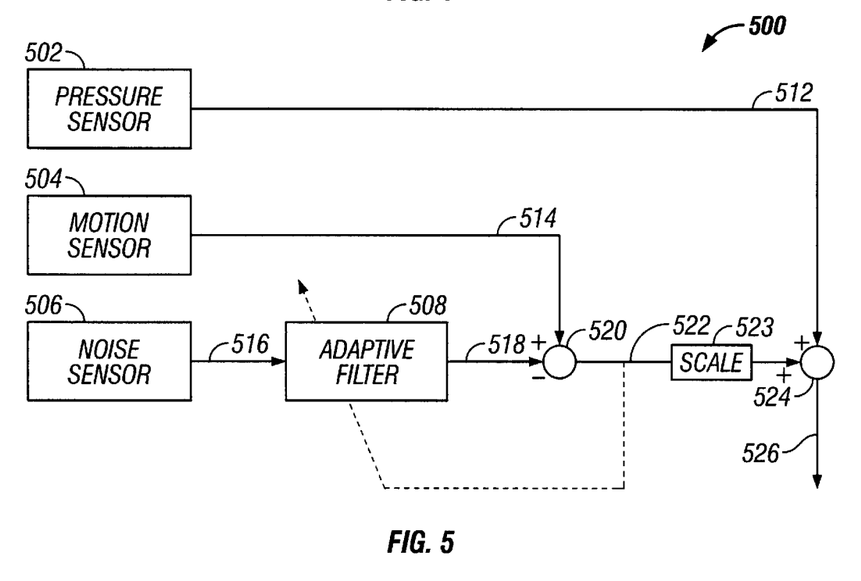
FIG. 5 is a schematic block diagram of the system for reducing the effect of secondary reflections from the water surface using the preferred embodiment of the noise reference sensor.

FIG. 5 shows a schematic block diagram of the method of the present invention for enhancing the effectiveness of a dual sensor towed streamer for reducing the effect of secondary reflections from the water surface on the seismic signal, generally designated as 500. This method demonstrates the use of dual sensors, a pressure sensor 502 and a motion sensor 504, in combination with the preferred embodiment of the third sensor 506, the noise reference sensor, to reduce the noise from the vibrations of the stress members of the streamer. The third sensor 506 generates a third signal 516, a noise reference signal, which is proportional to the vertical movement of the steamer. The third signal 516 is input to an adaptive filter 508. B. Widrow et al., *Adaptive Signal Processing*, Prentice-Hall. Inc., 1985, describes adaptive filters. The adaptive filter 508 primarily integrates the third signal 516 (an acceleration signal) to make it equivalent to the particle velocity in the output signal 514 of the motion sensor 504 caused only by the vibrations of the streamer's stress members. The adaptive filter 508 also adjusts the third signal 516 for the low frequency cutoff of the motion sensor 504 and for the damping coefficient differences between the third sensor 506 and the motion sensor 504. The operation of the adaptive noise canceller is discussed in Widrow. In brief, the noise canceling system of Widow as shown in FIG. 5b attempts to produce a system output $s+n_0-y$, that is a best fit in a least squares sense to the signal s. The signal s corresponds to the output 514 of the motion sensor in FIG. 5 while the noise n corresponds to the output 516 of the noise sensor in FIG. 5. This objective is accomplished by feeding the system output back to the adaptive filter and adjusting the filter output through an adaptive algorithm to minimize the total system output power. As noted in Widrow, the only assumption made is that s, $n_0$, and y are statistically stationary with zero mean, that s is uncorrelated with $n_0$ and y, and that the noise $n_1$ is uncorrelated with $n_0$. The method of Widrow is only an example of an adaptive noise cancellation algorithm and any other suitable method could also be used.

The adaptive filter 508 outputs a fourth signal 518, a filtered noise reference signal. The fourth signal 518 contains the portion of the vertical motion recorded in the second signal 514 contributed by the vertical motion of the streamer itself rather than the seismic wave propagating past. The fourth signal 518 is input to the negative input of a summing junction 520, while the second signal 514, from the motion sensor 504, is input to the positive terminal of the summing junction 520. The output from the summing junction 520 is a fifth signal 522, an enhanced motion signal. The fifth signal 522 has the streamer motion subtracted out, leaving just the water particle motion from the seismic wave. Because the third signal 516 contains just noise and none of the desired seismic reflection signals contained in the second signal 514, these desired reflections are enhanced in the fifth signal 522. The fifth signal 522 is scaled 523 and input to a positive terminal of a summing junction 524, while the first signal 512, from the pressure sensor 502, is input to another positive terminal of the summing junction 524. The scale factor relating the pressure and motion signals would be known to those versed in the art. It is discussed in U.S. Pat. No. 4,979,150. The output from the summing junction 524 reduces the undesired secondary reflections from the air-water interface in the first signal 512 and enhances the desired primary reflections from the formation layers in the earth, thus yielding the desired ghost-free signal 526.

Figure 5A:
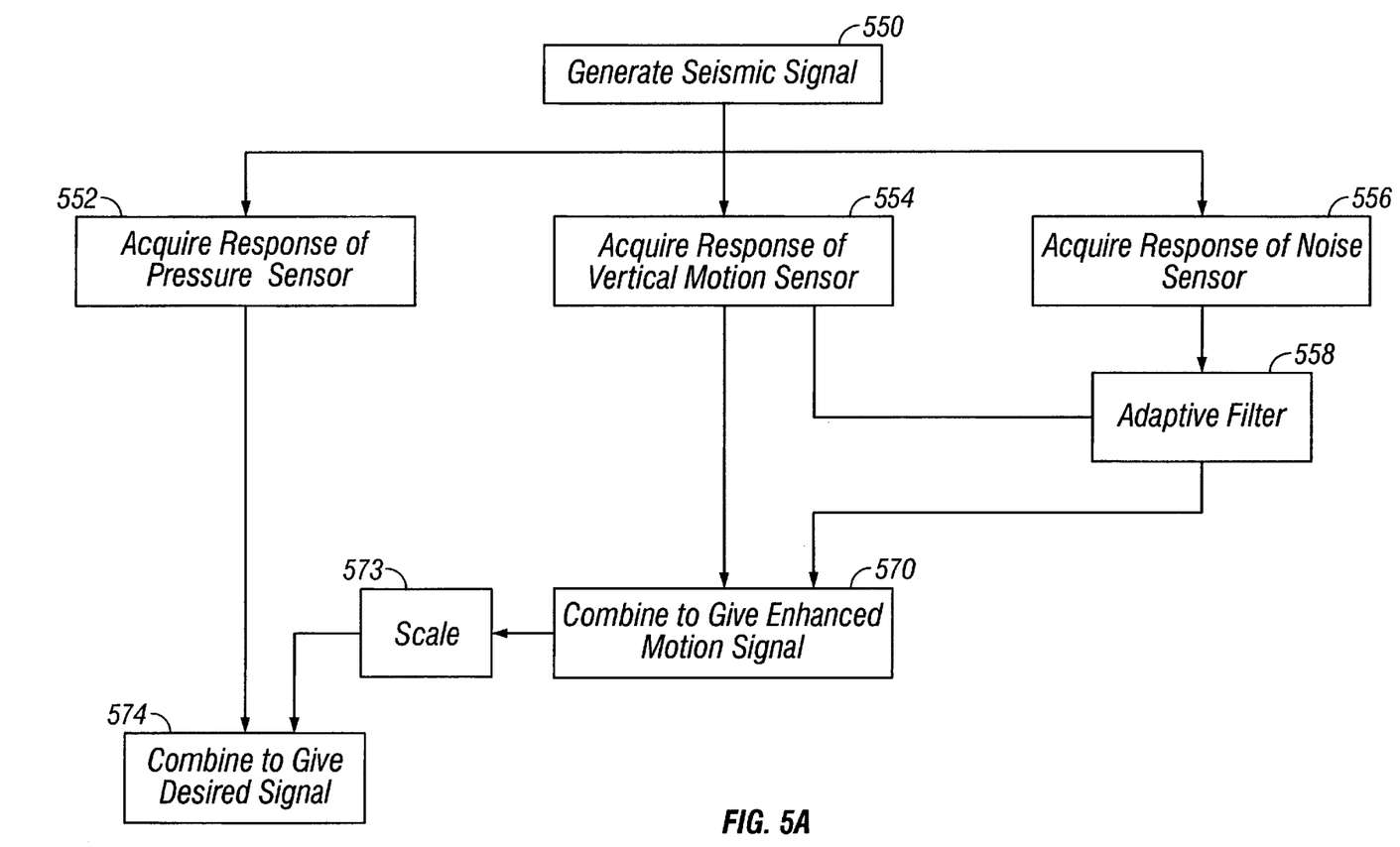
FIG. 5a is a schematic block diagram of the method of reducing the effect of secondary reflections from the water surface using the preferred embodiment of the noise reference sensor FIG. 5b (Prior Art) shows an adaptive noise cancellation system.
Figure 5B:
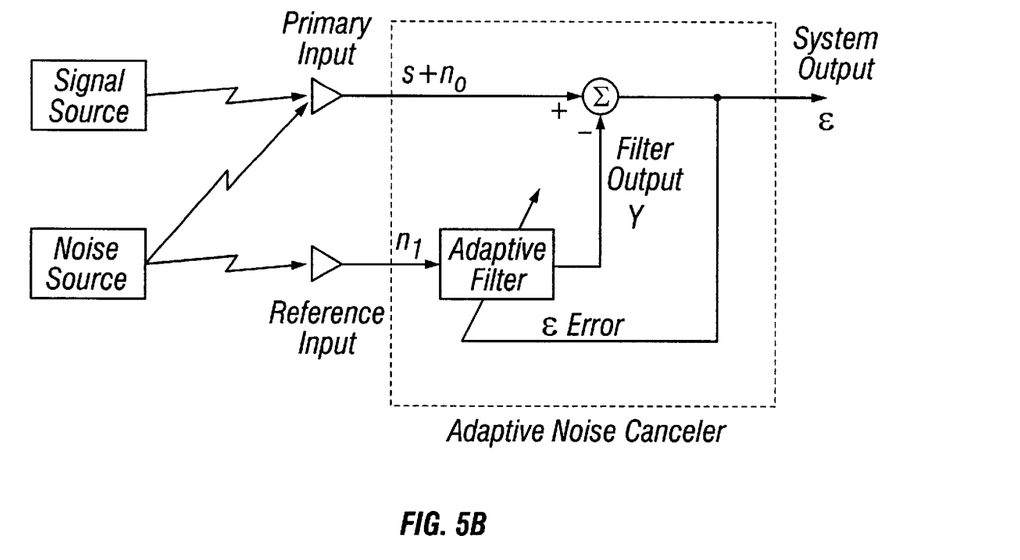

FIG. 5a is a flow chart showing the method of the preferred embodiment of the present invention using the steps indicated in FIG. 5. Seismic signals generally designated as 550 are generated. Signals are recorded with a pressure sensor 552 (first signal), a vertical motion sensor 554 (second signal), and a noise reference sensor 506 (first signal). The third signal is adaptively filtered 558 and combined 570 with the second signal.

The adaptive filter 558 outputs a fourth signal, a filtered noise reference signal. The fourth signal contains the portion of the vertical motion recorded in the second signal contributed by the vertical motion of the streamer itself rather than the seismic wave propagating past. The fourth signal is combined 570 with the second signal to give a fifth signal an enhanced motion signal. The fifth signal has the streamer motion subtracted out, leaving just the water particle motion from the seismic wave. Because the third signal contains just noise and none of the desired seismic reflection signals contained in the second signal, these desired reflections are enhanced in the fifth signal. The fifth signal is scaled 573 and combined 574 with the first signal from the pressure sensor 552, to give the desired ghost-free signal.

Figure 6:
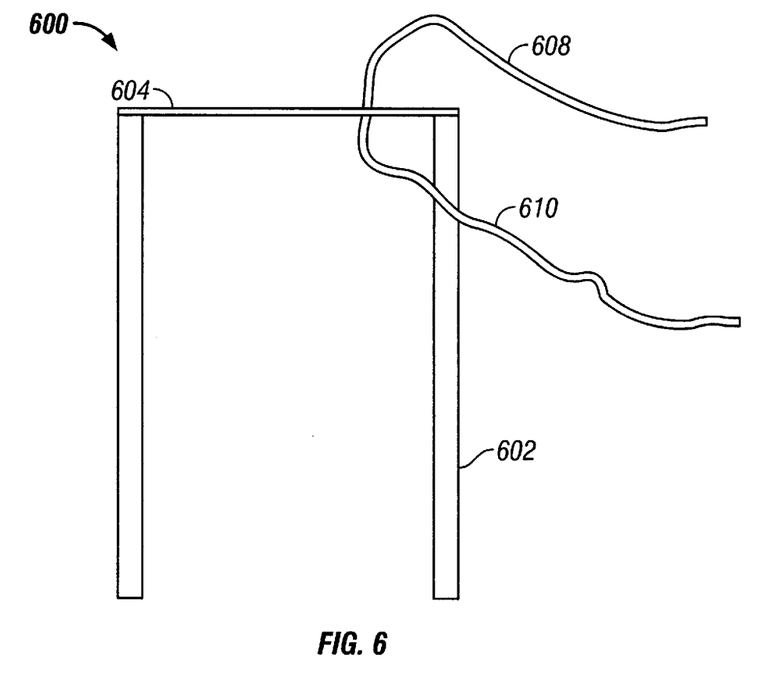
FIG. 6 is a view of an alternative embodiment of the noise reference sensor.

FIG. 6 shows an alternative embodiment of the noise reference sensor 600. This alternative embodiment uses only a single sheet 604 of polyvinylidene fluoride film rather than two (2) sheets and a single pair of wires 608, 610 rather than two (2) pairs. The alternative noise reference sensor 600 will still be quite sensitive to acceleration relative to the surrounding fluid when the acceleration is in a direction normal to the plane of the PVDF sheet 604. The alternative noise reference filter 600 will also be quite insensitive to acceleration if the fluid above and below the PVDF sheet 604 moves in harmony, because the PVDF sheet 604 has very low mass. This low mass gives the PVDF sheet 604 low sensitivity to inertial acceleration caused by particle velocity due to a passing seismic wave. However, because there is only one PVDF sheet 604, the alternate embodiment of the noise reference sensor 600 will be sensitive to the pressure manifestation of the seismic reflections. This sensitivity must be corrected for when using the alternative noise reference sensor 600 in a dual sensor towed streamer.

Figure 7:
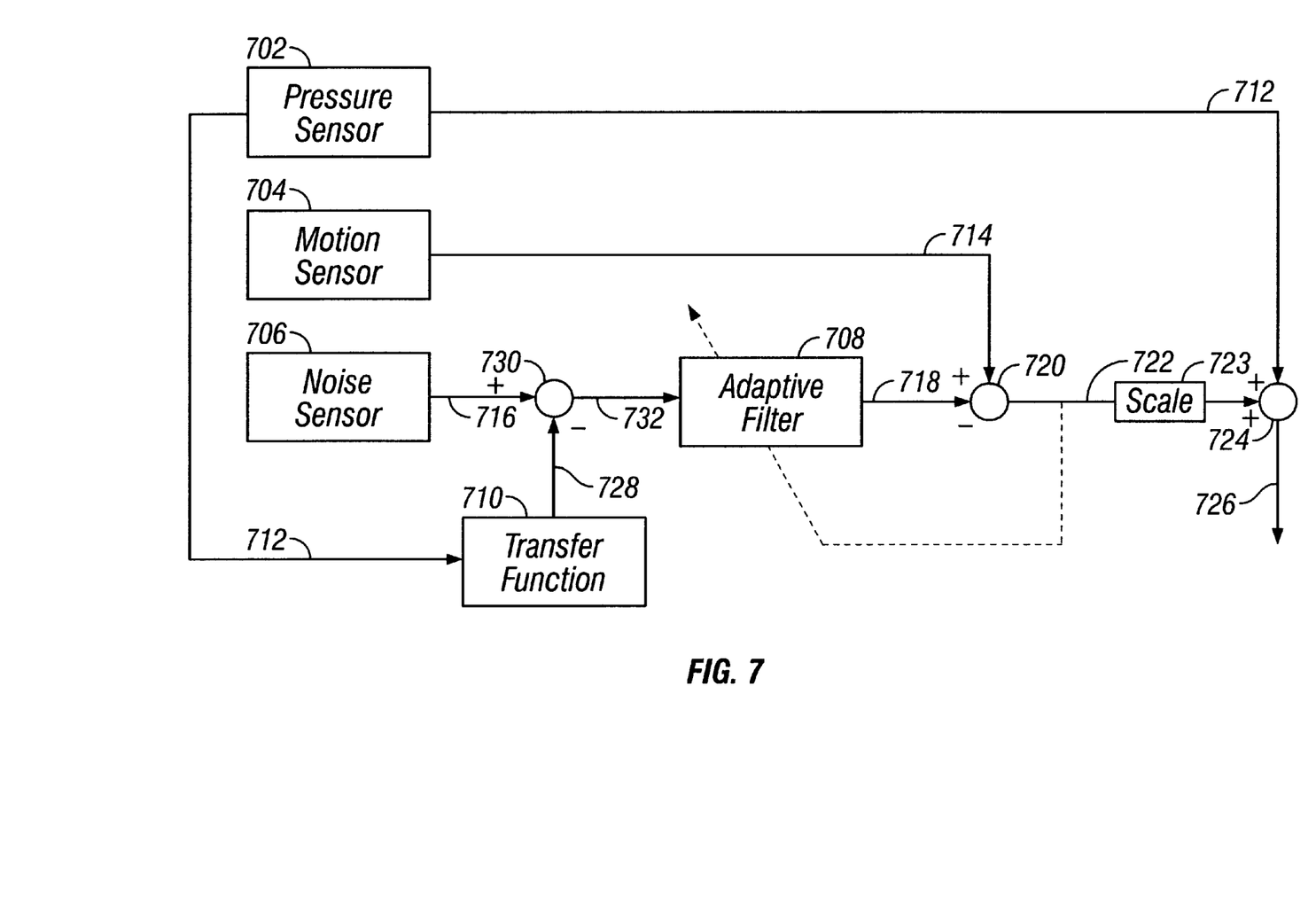
FIG. 7 is a schematic block diagram of the system for reducing the effect of secondary reflections from the water surface using the alternative embodiment of the noise reference sensor.

FIG. 7 shows a schematic block diagram of the method of the present invention using dual sensors, a pressure sensor 702 and a motion sensor 704, in combination with the alternative embodiment of the noise reference sensor 600. The transfer function 710 between the pressure signal 712 sensed by the pressure sensor 702 and the third signal 716 sensed by the noise reference sensor 706 can be measured by bringing the seismic streamer to zero towing velocity long enough to record one seismic reflection record. Under this condition, the only output from the alternative noise reference sensor 706 will be due to the pressure manifestation of the passing seismic wave. This transfer function 710 can then be used to correct the pressure signal 712 generated by the pressure sensor 702 for optimum subtraction from the noise reference signal 716 under normal towing conditions. Applying the transfer function 710 to the pressure signal 712 yields the corrected pressure signal 728. The corrected pressure signal 728 can then be subtracted from the noise reference signal 716 of the alternative noise reference sensor 706 in summing junction 730. This subtracting yields the corrected noise reference signal 732. The corrected noise reference signal 732 is now input to an adaptive filter 708. The filtered output signal 718 from the adaptive filter 708, is then subtracted from the motion signal 714 in summing junction 720. The difference signal 722 is scaled 723 and added to the pressure sensor signal 712 at the summer 724. This combining yields the desired final output signal, the ghost-free signal 726.

Figure 7A:
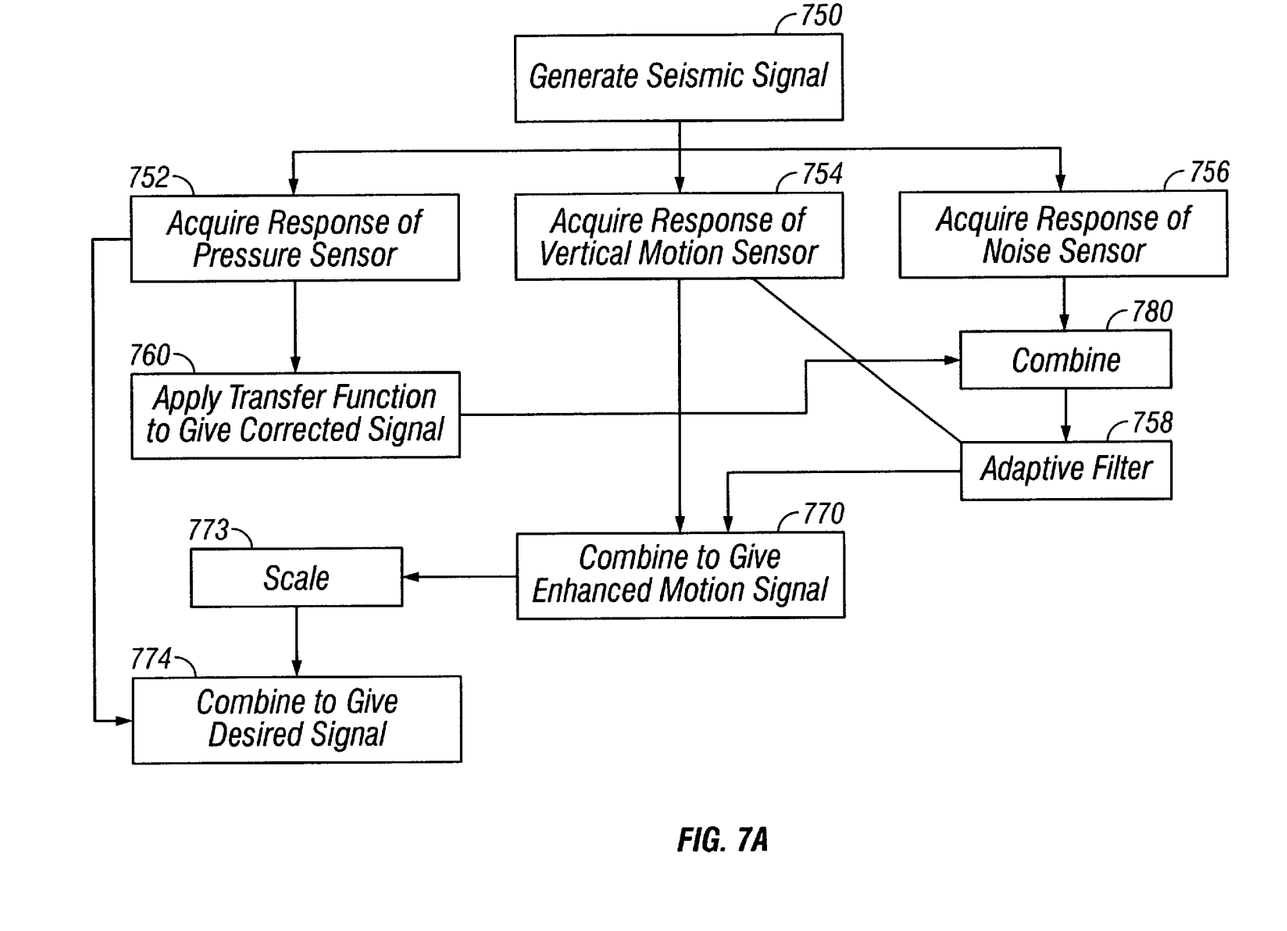
FIG. 7a is a schematic block diagram of the method of reducing the effect of secondary reflections film the water surface using the alternative embodiment of the noise reference sensor.

FIG. 7a is a flow chart showing the implementation of the steps indicated in FIG. 7. Seismic signals are generated 750 and signals recorded using a pressure sensor 752 (first signal), a motion sensor 754 (second signal), and a noise reference sensor 756 (third signal). A transfer function 760 between the first signal sensed and the third signal is measured by bringing the seismic streamer to zero towing velocity long enough to record one seismic reflection record. Under this condition, the only output from the alternative noise reference sensor 756 will be due to the pressure manifestation of the passing seismic wave. This transfer function 760 can then be used to correct the first signal generated by the pressure sensor 752 for optimum subtraction from the noise reference signal 756 under normal towing conditions. The transfer function 710 is applied to the first signal to give a corrected pressure signal. The corrected pressure signal is combined 780 with the noise third signal of the noise reference sensor 756. This combination yields the corrected noise reference signal. The corrected noise reference signal is now input to an adaptive filter 758. The filtered output signal from the adaptive filter 708, is then combined with 770 the second signal motion signal 714 The output of 770 is scaled 773 and combined 774 with the first signal. This combining yields the desired final output signal, the ghost-free signal.

Those versed in the art would recognize that embodiments of the invention depicted in the flow charts of FIGS. 5 and 7 may be implemented by suitable electronic circuits or in a digital computer. Both types of implementation are intended to be within the scope of the invention.

The sensors signals—the noise reference signal, the motion signal, and the pressure signal—can be transmitted to the ship, where the appropriate integrating, filtering, scaling and combination can be performed by computer or other suitable electronic devices.

The present has been described with a certain degree of specificity. Variations will occur to those skilled in the art which are within the scope of this invention. while the foregoing disclosure is directed to the preferred embodiments of the invention, various modifications will be apparent to those skilled in the art. It is intended that all variations within the scope and spirit of the appended claims be embraced by the foregoing disclosure.

What is claimed:

1. A method of marine seismic surveying, comprising:
   (a) towing a seismic streamer in a body of water;
   (b) deploying on said streamer a pressure sensor generating a first signal indicative of pressure of the water, a motion sensor generating a second signal indicative of vertical movement of said water, a noise sensor generating a third signal indicative of vertical acceleration of said streamer relative to the water;
   (c) generating a seismic signal in said water;
   (d) detecting the resulting signal with each of said sensors simultaneously during time intervals following said generation of said seismic signal;
   (e) combining said second signal with said third signal to generate a fourth signal indicative of motion of the water; and
   (f) combining said first signal with said fourth signal.

2. The method of claim 1, wherein said noise sensor is substantially unresponsive to pressure in said body of water resulting from said seismic signal and substantially unresponsive to vertical movement of said water resulting from said seismic signal.

3. The method of claim 1, wherein said combining said second signal with said third signal further comprises:
   equalizing said second signal with said third signal before combining said second signal with said third signal.

4. The method of claim 3, wherein said equalizing step further comprises:

integrating said third signal with an adaptive filter to make said third signal equivalent to said second signal.

5. The method of claim 4, wherein said equalizing step further comprises:

adjusting said third signal with said adaptive filter for the low frequency cutoff of said second sensor.

6. The method of claim 4, wherein said equalizing step further comprises:

adjusting said third s with said adaptive filter for the differences in damping coefficients between said motion sensor and said noise sensor.

7. The method of claim 4, wherein said equalizing step further comprises:

(i) inputting said third signal to an adaptive filter;

(ii) outputting a fifth signal from said adaptive filter;

(iii) combining said second signal with said fifth to yield said fourth signal;

(iv) adjusting the parameters of said adaptive filter;

(v) inputting said fourth signal to said adaptive filter; and (vi) iterating steps (ii) through (v) until said second signal and said fifth signal are substantially equalized.

8. The method of claim 1 wherein combining said first signal with said fourth signal further comprises application of a scale factor to the fourth signal.

9. A method of marine seismic surveying, comprising:

(a) towing a seismic stremer in water;

(b) deploying on said streamer a first sensor generating a first signal indicative of pressure of said water, a second sensor generating a second signal indicative of vertical movement of said water, and a third sensor generating a third signal indicative of vertical movement of said streamer relative to the water, wherein said second sensor is in close proximity to said first sensor and said third sensor is in close proximity to said second sensor;

(c) generating a seismic signal in said water;

(d) detecting the resulting signal with each of said sensors simultaneously during time intervals following said generation of said seismic signal;

(e) combining said first signal with said third signal to generate a fourth signal; and (f) combining said second signal with said fourth signal to generate a fifth signal; and (g) combining said first signal with said fifth signal.

10. The method of claim 9, wherein said third sensor is substantially unresponsive to vertical movement of said water resulting from said seismic signal.

11. The method of claim 9, wherein said combining said first signal step further comprises:

equalizing said first signal with said third signal before combining said first signal with said third signal.

12. The method of claim 11, wherein said equalizing step comprises:

(i) inputting said fourth signal to an adaptive filter;

(ii) outputting a seventh signal from said adaptive filter; and (iii) combining said second signal with said seventh signal to yield said fifth signal.

13. The method of claim 12, wherein said outputting step comprises:

integrating said third signal with said adaptive filter to make said third signal equivalent to said second signal.

14. The method of claim 12, wherein said outputting step further comprises:

adjusting said third signal with said adaptive filter for the low frequency cutoff of said second sensor.

15. The method of claim 12, wherein said outputting step further comprises:

adjusting said third signal with said adaptive filter for the differences in damping coefficients between said second sensor and said third sensor.

16. The method of claim 9, wherein said combining said first signal step comprises:

(i) calculating a transfer function;

(ii) applying said transfer function to said first signal to yield a sixth signal; and;

(iii) combining said third signal with said sixth signal to yield said fourth signal.

17. The method of claim 16, wherein said calculating step comprises:

comparing said first signal and said third signal while said streamer is at zero towing velocity.

18. An apparatus for marine seismic surveying, comprising:

(a) a streamer towed in water;

(b) a first sensor, deployed in said streamer, for generating a first signal indicative of pressure of said water;

(c) a second sensor, deployed in said streamer, for generating a second signal indicative of vertical movement of said water;

(d) a third sensor, deployed in said streamer, for generating a third signal indicative of vertical acceleration of said streamer relative to said water;

(e) a device for combining said second signal with said third signal to generate a fourth signal; and (f) a device for combining said first signal with said fourth signal.

19. The apparatus of claim 18, wherein said third sensor is substantially unresponsive to pressure of said water resulting from said seismic signal and substantially unresponsive to vertical movement of said water resulting from said seismic signal.

20. The apparatus of claim 18, further comprising:

a device for equalizing said second signal with said fourth signal before combining said second signal with said fourth signal.

21. The apparatus of claim 20, wherein said equalizing device comprises:

(i) an adaptive filter;

(ii) a device for inputting said third signal to said adaptive filter;

(iii) a device for outputting a fifth signal from said adaptive filter; and (iv) a device for combining said second signal with said fifth signal to generate said fourth signal.

22. The apparatus of claim 21, wherein said adaptive filter comprises:

an integrator for integrating said third signal to make said third signal equivalent to said second signal.

23. The apparatus of claim 21, wherein said adaptive filter further comprises:

a filter for adjusting said third signal for the low frequency cutoff of said second sensor.

24. The apparatus of claim 21, wherein said adaptive filter further comprises:

an equalizer for adjusting said third signal for the differences in damping coefficients between said second sensor and said third sensor.

25. The apparatus of claim 18, wherein said third sensor comprises:
(i) a housing having first and second end;
(ii) a first element and a second element, each having opposing first and second faces, said first and second elements made of piezoelectric material, said first element coupled to said first end of said housing and said second element coupled to said second end of said housing, said first and second elements parallel to each other; and
(iii) a first pair of electrical connectors coupled to opposing faces of said second element, said electrical connectors connected to said elements so that said apparatus is sensitive to acceleration and insensitive to pressure waves.

26. The apparatus of claim 25, wherein said piezoelectric material is polyvinylidene fluoride film.

27. An apparatus for marine seismic surveying, comprising:
(a) a streamer towed in water;
(b) a first sensor deployed in said streamer, said first sensor generating a first signal responsive to pressure of said water;
(c) a second sensor deployed in said streamer in close proximity to said first sensor, said second sensor generating a second signal responsive to vertical movement of said water;
(d) a third sensor deployed in said streamer in close proximity to said second sensor, said third sensor generating a third signal responsive to pressure in said water and vertical movement of said streamer;
(e) an arrangement for combining said first signal with said third signal to generate a fourth signal;
(f) an arrangement for combining said second signal with said fourth signal to generate a fifth signal; and
(g) an arrangement for combining said first signal with said fifth signal.

28. The apparatus of claim 27, wherein said arrangement for combining said first signal comprises:

a device for calculating a transfer function between said first signal and said third signal;
a device for applying said transfer function to said first signal and generating a sixth signal; and
a device for combining said third signal with said sixth signal and generating said fourth signal.

29. The apparatus of claim 28, wherein said device for combining said second signal further comprises:
(A) an adaptive filter;
(B) a device for inputting said fourth signal to said adaptive filter;
(C) a device for outputting a seventh signal from said adaptive filter; and
(D) a device for combining said second signal with said seventh signal to generate said fifth signal.

30. The apparatus of claim 29, wherein said adaptive filter comprises:
an integrator for integrating said third signal to make said third signal equivalent to said second signal.

31. The apparatus of claim 29, wherein said adaptive filter further comprises:
a filter for adjusting said third signal for the low frequency cutoff of said second sensor.

32. The apparatus of claim 29, wherein said adaptive filter further comprises:
an equalizer for adjusting said third signal for the differences in damping coefficients between said second sensor and said third sensor.

33. The apparatus of claim 27, wherein said third sensor comprises:
(i) a housing having a first end;
(ii) a element made of piezoelectric material, said element having opposing first and second faces, said element coupled to said first end of said housing; and
(iii) a pair of electrical connectors coupled to opposing faces of said element.

34. The apparatus of claim 33, wherein said piezoelectric material is polyvinylidene fluoride film.

* * * * *

UNITED STATES PATENT AND TRADEMARK OFFICE
CERTIFICATE OF CORRECTION

| | | |
|---|---|---|
| PATENT NO. | : 6,512,980 B1 | Page 1 of 1 |
| APPLICATION NO. | : 09/421163 | |
| DATED | : January 28, 2003 | |
| INVENTOR(S) | : Frederick J. Barr | |

It is certified that error appears in the above-identified patent and that said Letters Patent is hereby corrected as shown below:

Please add --Assignee: WesternGeco L.L.C.--

Signed and Sealed this

Third Day of October, 2006

JON W. DUDAS
*Director of the United States Patent and Trademark Office*